US008803796B2

(12) United States Patent
Cruz-Hernandez et al.

(10) Patent No.: US 8,803,796 B2
(45) Date of Patent: Aug. 12, 2014

(54) PRODUCTS AND PROCESSES FOR PROVIDING HAPTIC FEEDBACK IN A USER INTERFACE (75) Inventors: Juan Manuel Cruz-Hernandez, Montreal (CA); Michael D. Levin, Mountain View, CA (US)

(73) Assignee: Immersion Corporation, San Jose, CA (US)

( * ) Notice: Subject to any disclaimer, the term of this patent is extended or adjusted under 35 U.S.C. 154(b) by 2559 days.

(21) Appl. No.: 10/926,644

(22) Filed: Aug. 26, 2004

(65) Prior Publication Data
US 2006/0044258 A1    Mar. 2, 2006

(51) Int. Cl.
G09G 5/00         (2006.01)

(52) U.S. Cl.
USPC ............................................ 345/156; 345/184

(58) Field of Classification Search
USPC .................................. 345/970, 974, 156–184
See application file for complete search history.

(56) References Cited

U.S. PATENT DOCUMENTS

| | | |
|---|---|---|
| 3,157,853 A | 11/1964 | Hirsch |
| 3,198,293 A | 8/1965 | Mathews |
| 3,220,121 A | 11/1965 | Cutler |
| 3,497,668 A | 2/1970 | Hirsch |
| 3,517,446 A | 6/1970 | Corlyon et al. |
| 3,795,150 A | 3/1974 | Eckhardt |
| 3,812,936 A | 5/1974 | Dane |
| 3,902,687 A | 9/1975 | Hightower |
| 3,903,614 A | 9/1975 | Diamond et al. |
| 4,160,508 A | 7/1979 | Salisbury, Jr. et al. |
| 4,236,325 A | 12/1980 | Hall et al. |
| 4,262,240 A | 4/1981 | Arai |
| 4,400,790 A | 8/1983 | Chambers et al. |
| 4,513,235 A | 4/1985 | Acklam et al. |
| 4,553,080 A | 11/1985 | Cannon et al. |
| 4,560,983 A | 12/1985 | Williams |
| 4,581,491 A | 4/1986 | Boothroyd |
| 4,599,070 A | 7/1986 | Hladky et al. |
| 4,652,805 A | 3/1987 | Kohn |
| 4,706,294 A | 11/1987 | Ouchida |
| 4,708,656 A | 11/1987 | De Vries et al. |
| 4,713,007 A | 12/1987 | Alban |
| 4,758,165 A | 7/1988 | Tieman et al. |

(Continued)

FOREIGN PATENT DOCUMENTS

| | | |
|---|---|---|
| EP | 0111992 | 6/1984 |
| EP | 0349086 | 1/1990 |

(Continued)

OTHER PUBLICATIONS

Adelstein, B. et al., A High Performance Two Degree-of-Freedom Kinesthetic Interface, Massachusetts Institute of Technology, Cambridge Massachusetts, N95-14042.

(Continued)

*Primary Examiner* — Hong Zhou
(74) *Attorney, Agent, or Firm* — Kilpatrick Townsend & Stockton LLP (57) ABSTRACT

The present invention provides an apparatus and system for providing haptic feedback in a user interface. In one embodiment, the apparatus includes a manipulandum, a resistive actuator, and a biasing element disposed between the manipulandum and the resistive actuator. Further, the biasing element is coupled to one of the manipulandum or the resistive actuator and releasably coupled to the housing, the manipulandum or the resistive actuator.

30 Claims, 3 Drawing Sheets

(56) References Cited

U.S. PATENT DOCUMENTS

| | | | |
|---|---|---|---|
| 4,823,106 A | 4/1989 | Lovell | |
| 4,859,922 A | 8/1989 | Tauchenitz et al. | |
| 4,868,549 A | 9/1989 | Affinito et al. | |
| 4,891,764 A | 1/1990 | McIntosh | |
| 4,930,770 A | 6/1990 | Baker | |
| 4,934,694 A | 6/1990 | McIntosh | |
| 4,947,097 A | 8/1990 | Tao | |
| 5,019,761 A | 5/1991 | Kraft | |
| 5,022,407 A | 6/1991 | Horch et al. | |
| 5,035,242 A | 7/1991 | Franklin | |
| 5,038,089 A | 8/1991 | Szakaly | |
| 5,078,152 A | 1/1992 | Bond | |
| 5,086,296 A | 2/1992 | Clark | |
| 5,116,051 A | 5/1992 | Moncrief et al. | |
| 5,116,180 A | 5/1992 | Fung et al. | |
| 5,185,561 A | 2/1993 | Good et al. | |
| 5,186,695 A | 2/1993 | Mangseth et al. | |
| 5,187,630 A | 2/1993 | MacKay et al. | |
| 5,189,355 A | 2/1993 | Larkins et al. | |
| 5,191,320 A | 3/1993 | MacKay | |
| 5,212,473 A | 5/1993 | Louis | |
| 5,220,260 A | 6/1993 | Schuler | |
| 5,240,417 A | 8/1993 | Smithson et al. | |
| 5,270,689 A | 12/1993 | Hermann | |
| 5,271,290 A | 12/1993 | Fischer | |
| 5,275,174 A | 1/1994 | Cook | |
| 5,299,810 A | 4/1994 | Pierce | |
| 5,309,140 A | 5/1994 | Everett | |
| 5,334,027 A | 8/1994 | Wherlock | |
| 5,368,484 A | 11/1994 | Copperman et al. | |
| 5,381,080 A | 1/1995 | Schnell et al. | |
| 5,382,373 A | 1/1995 | Carlson et al. | |
| 5,396,266 A | 3/1995 | Brimhall | |
| 5,466,213 A | 11/1995 | Hogan | |
| 5,492,312 A | 2/1996 | Carlson | |
| 5,542,672 A | 8/1996 | Meredith | |
| 5,547,382 A | 8/1996 | Yamasaki | |
| 5,559,432 A | 9/1996 | Logue | |
| 5,577,581 A | 11/1996 | Eberwein et al. | |
| 5,578,238 A | 11/1996 | Weiss et al. | |
| 5,580,249 A | 12/1996 | Jacobsen et al. | |
| 5,591,082 A | 1/1997 | Jensen et al. | |
| 5,665,946 A | 9/1997 | Nishijima et al. | |
| 5,683,615 A | 11/1997 | Munoz | |
| 5,705,085 A | 1/1998 | Munoz et al. | |
| 5,711,746 A | 1/1998 | Carlson | |
| 5,714,978 A | 2/1998 | Yamanaka et al. | |
| 5,721,566 A | 2/1998 | Rosenberg et al. | |
| 5,730,655 A | 3/1998 | Meredith | |
| 5,766,016 A | 6/1998 | Sinclair | |
| 5,767,836 A | 6/1998 | Scheffer et al. | |
| 5,767,839 A | 6/1998 | Rosenberg | |
| 5,781,172 A | 7/1998 | Engel et al. | |
| 5,785,630 A | 7/1998 | Bobick et al. | |
| 5,793,598 A | 8/1998 | Watanabe et al. | |
| 5,816,105 A | 10/1998 | Adelstein | |
| 5,816,823 A | 10/1998 | Naimark et al. | |
| 5,914,705 A | 6/1999 | Johnson et al. | |
| 5,944,151 A | 8/1999 | Jakobs et al. | |
| 6,002,184 A | 12/1999 | Delson et al. | |
| 6,008,800 A | 12/1999 | Pryor | |
| 6,087,829 A | 7/2000 | Jager | |
| 6,100,476 A | 8/2000 | Adamietz et al. | |
| 6,104,382 A * | 8/2000 | Martin et al. | 345/161 |
| 6,111,577 A | 8/2000 | Zilles et al. | |
| 6,128,006 A | 10/2000 | Rosenberg et al. | |
| 6,147,422 A | 11/2000 | Delson et al. | |
| 6,154,201 A * | 11/2000 | Levin et al. | 345/184 |
| 6,211,861 B1 | 4/2001 | Rosenberg et al. | |
| 6,215,470 B1 | 4/2001 | Rosenberg et al. | |
| 6,219,034 B1 | 4/2001 | Elbing et al. | |
| 6,243,078 B1 | 6/2001 | Rosenberg | |
| 6,262,717 B1 | 7/2001 | Donohue et al. | |
| 6,271,828 B1 | 8/2001 | Rosenberg et al. | |
| 6,271,833 B1 | 8/2001 | Rosenberg et al. | |
| 6,271,834 B1 | 8/2001 | May et al. | |
| 6,283,859 B1 | 9/2001 | Carlson et al. | |
| 6,307,285 B1 | 10/2001 | Delson et al. | |
| 6,315,088 B1 | 11/2001 | Gustin et al. | |
| 6,337,678 B1 | 1/2002 | Fish | |
| 6,348,772 B1 | 2/2002 | May | |
| 6,373,465 B2 | 4/2002 | Jolly et al. | |
| 6,394,239 B1 | 5/2002 | Carlson | |
| 6,400,352 B1 | 6/2002 | Bruneau et al. | |
| 6,420,806 B2 | 7/2002 | Wittig | |
| 6,422,941 B1 | 7/2002 | Thorner et al. | |
| 6,468,158 B1 | 10/2002 | Ootori et al. | |
| 6,480,752 B1 | 11/2002 | Blume et al. | |
| 6,486,872 B2 | 11/2002 | Rosenberg et al. | |
| 6,589,117 B1 | 7/2003 | Moritome et al. | |
| 6,591,175 B2 | 7/2003 | Numata et al. | |
| RE38,242 E | 9/2003 | Engel et al. | |
| 6,613,997 B2 | 9/2003 | Oster et al. | |
| 6,636,202 B2 | 10/2003 | Ishmael, Jr. et al. | |
| 6,637,311 B2 | 10/2003 | Barden | |
| 6,640,940 B2 | 11/2003 | Carlson | |
| 6,646,632 B2 | 11/2003 | Wegmuller et al. | |
| 6,854,573 B2 | 2/2005 | Jolly et al. | |
| 6,864,620 B2 | 3/2005 | Takeuchi et al. | |
| 7,283,120 B2 * | 10/2007 | Grant | 345/156 |
| 2001/0052893 A1 | 12/2001 | Jolly et al. | |
| 2002/0044132 A1 | 4/2002 | Fish | |
| 2002/0067336 A1 | 6/2002 | Wegmuller et al. | |
| 2002/0084983 A1 | 7/2002 | Boldy | |
| 2002/0158842 A1 | 10/2002 | Guy et al. | |
| 2003/0006958 A1 | 1/2003 | Onodera | |
| 2003/0038774 A1 | 2/2003 | Piot et al. | |
| 2003/0079948 A1 | 5/2003 | Jolly et al. | |
| 2003/0080939 A1 | 5/2003 | Kobayashi | |
| 2003/0176263 A1 * | 9/2003 | Parmater | 482/140 |
| 2003/0184518 A1 | 10/2003 | Numata et al. | |
| 2004/0040800 A1 * | 3/2004 | Anastas et al. | 188/161 |
| 2004/0206611 A1 | 10/2004 | Kobayashi | |
| 2006/0012584 A1 * | 1/2006 | Vassallo et al. | 345/184 |
| 2008/0062143 A1 * | 3/2008 | Shahoian et al. | 345/173 |

FOREIGN PATENT DOCUMENTS

| | | |
|---|---|---|
| EP | 0640902 A2 | 3/1995 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Berkelmaan, P. et al., Interacting with Virtual Environments using a Magnetic Levitation Haptic Interface, International Conference in Intelligent Robots and Systems (IROS), 95, Pittsburgh, pp. 1-6.

Rosenberg, L. et al., Perceptual Decomposition of Virtual Haptic Surfaces, Center for Design Research, Stanford University, Stanford, CA, pp. 46-53.

Adelstein, "Design and Implementation of a Force Reflecting Manipulandum for Manual Control Research," DSC-vol. 42, Advances in Robotics, Edited by H. Kazerooni, pp. 1-12, 1992.

Adelstein, "A Virtual Environment System for the Study of Human Arm Tremor," Ph.D. Dissertation, Dept. of Mechanical Engineering, MIT, Jun. 1989.

Aukstakalnis et al., "Silicon. Mirage: The Art and Science of Virtual Reality," ISBN 0-938151-82-7, pp. 129-180, 1992.

Badescu, "Rotary Haptic Knob for Vehicular Instrument Controls," Proceedings of the 10th Symp. on Haptic Interfaces for Virtual Envir. & Teleoperator Systems, (HAPTICS'02), 2002.

Baigrie, "Electric Control Loading—A Low Cost, High Performance Alternative," Proceedings, pp. 247-254, Nov. 6-8, 1990.

Bejczy et al., "A Laboratory Breadboard System for Dual-Arm Teleoperation," SOAR '89 Workshop, JSC, Houston, TX, Jul. 25-27, 1989.

Bejczy et al., "Kenesthetic Coupling Between Operator and Remote Manipulator," International Computer Technology Conference, The American Society of Mechanical Engineers, San Francisco, CA, Aug. 12-15, 1980.

(56) References Cited

OTHER PUBLICATIONS

Bejczy, "Generalization of Bilateral Force-Reflecting Control of Manipulators," Proceedings of Fourth CISM-IFToMM, Sep. 8-12, 1981.

Bejczy, "Sensors, Controls and Man-Machine Interface for Advanced Teleoperation," Science, vol. 208, No. 4450, pp. 1327-1335, 1980.

Bejczy et al., "Universal Computer Control System (UCCS) for Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

Colgate, J, Edward et al., "Implementation of Stiff Virtual Walls in Force-Reflecting Interfaces," Department of Mechanical Engineering, Northwestern University, Evanston, IL, Sep. 1993.

"Cyberman Technical Specification," Logitech Cyberman SWIFT Supplement, Apr. 5, 1994.

Eberhardt et al., "Inducing Dynamic Haptic Perception by The Hand: System Description and Some Results," DSC-vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device with Force and Tactile Feedback," vol. 32, No. 98, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 15-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine, The Cutting Edge, Sep. 8-11, 1994.

McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouh Young et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh Young, "Force Display in Molecular Docking," Order No. 9034744, pp. 1-369, 1990.

Ouh Young, "A Low-Cost Force Feedback Joystick and Its Use in PC Video Games," IEEE Transactions on Consumer Electronics, vol. 41, No. 3, Aug. 1995.

Patrick et al., "Design and Testing of a Non-Reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of the Acoustical Society of America, vol. 82, No. 4, Oct. 1987.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Library Archives Aug. 14, 1990, pp. 1-131, May 1990.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators," MIT Archive © Massachusetts Institute of Technology, pp. 1-88, Feb. 1990.

Terry et al., "Tactile Feedback in a Computer Mouse," Proceedings of Fourteenth Annual Northeast Bioengineering Conference, University of New Hampshire, Mar. 10-11, 1988.

\* cited by examiner

PRODUCTS AND PROCESSES FOR PROVIDING HAPTIC FEEDBACK IN A USER INTERFACE

FIELD OF THE INVENTION

The present invention generally relates to products and processes for providing haptic feedback.

BACKGROUND

Tactile cues and feedback enhance the human-machine interface. Providing tactile feedback increases the amount of information available to a user in the operation of a device. Some devices utilize structural tactile methods. One such example is to provide a raised surface on an input surface, e.g., keypad, of the device. Such methods, however, are inherently static, and thus, cannot offer a wide array of, or effective, tactile feedback. Whereas before, one had to rely solely on aural, visual, and/or structural tactile cues, haptics increasingly provide greater and more effective physical cues to users of various devices.

A device may incorporate a variety of technologies for providing haptic feedback, including active and/or passive devices. Active haptic feedback devices, including, for example, motors, add energy to a system. Passive haptic feedback devices (also referred to as resistive devices), such as brakes, remove energy from a system.

Resistive devices have a number of advantages over active devices, including, for example, reduced manufacturing cost and lower power consumption. A noteworthy shortcoming of resistive devices, however, is that resistive devices typically can only oppose a motion or movement. Thus, unlike active devices, resistive devices generally cannot provide assistive forces that may be useful in directing a user to a preferred location.

SUMMARY

The present invention provides products and processes for providing haptic feedback in a user interface device. In one exemplary embodiment of the present invention, an apparatus may comprise a manipulandum, a resistive actuator, and a biasing element disposed between the manipulandum and the actuator. The biasing element may be coupled to at least one of the manipulandum and the actuator.

Exemplary embodiments are mentioned not to limit the invention, but to provide an example of an embodiment of the invention to aid understanding. Exemplary embodiments are discussed in the Detailed Description, and further description of the invention is provided there. Advantages offered by the various embodiments of the present invention may be understood by examining this specification.

BRIEF DESCRIPTION OF THE DRAWINGS

The accompanying drawings, which constitute part of this specification, help to illustrate embodiments of the invention. In the drawings, like numerals are used to indicate like elements throughout.

DETAILED DESCRIPTION

Embodiments of the present invention include products and processes for providing haptic feedback in a user interface device. In some interface devices, cutaneous feedback (such as, without limitation, vibration, texture, and heat), is also provided to a user, in addition to kinesthetic feedback (such as, without limitation, forces or resistances sensed by muscles, tendons, and/or joints) both subsumed under the phrase, and more generally known collectively as, "haptic feedback." The present invention may be embodied in handheld devices, such as mobile phones, personal digital assistants ("PDAs"), camcorders, and other devices, such as control knobs and computer mice and joysticks.

Figure 1:
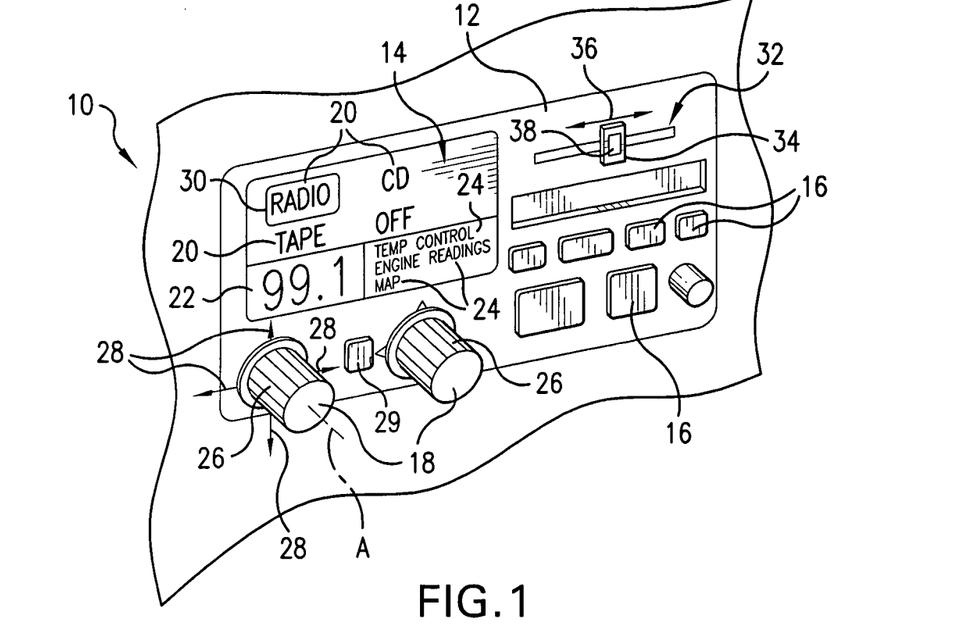
FIG. 1 shows a perspective, cutaway view of an embodiment of an apparatus according to the present invention.

Referring now to FIG. 1, a perspective, cutaway view of a control panel 12 for a device 10 including an embodiment of the present invention is shown. In the described embodiment, device 10 comprises an audio device operable to transmit sound from one or more signals, such as cassette tapes, compact discs (CDs) or other optical discs, or radio signals transmitted from a broadcasting station or satellite.

The device 10 is not limited to an audio device. For example, the device 10 may also include systems to monitor and/or control temperature in a vehicle cabin as well as systems to provide information on and/or control operating characteristics of a vehicle, such as vehicle speed, engine temperature, fuel or other fluid levels, etc. Other systems may include a navigation system that displays a map and current location of the vehicle with respect to the map, a cellular or mobile telephone, and a security/alarm system. The present invention is not limited to the applications described above, but may be used in other user interface systems as well, such as PDAs, camcorders, cellular telephones, etc.

Device 10 may be physically coupled to the control panel 12. Alternatively, device 10 may be physically remote from the control panel 12, and may communicate with the device 10 using signals transferred through wires, cables, wireless transmitters/receivers, etc.

Device 10 includes a front panel 12, a display 14, and at least one manipulandum (e.g., user interface device) according to the present invention, such as buttons 16 and control knobs 18. Front panel 12 may be mounted, for example, on an interior of a vehicle, such as on or below the dashboard, or in some other suitable area. Alternatively, the front panel 12 may be an external surface of a housing of the device 10 itself, such as a stereo unit. The device 10 generally may include several functions, such as playing an audio track, adjusting volume, tone, or balance of an audio output, displaying an image (icons, a map, etc.), or adjusting the temperature or fan speed of a vehicle, which may be set or changed by a user manipulating the controls of the device 10 on front panel 12.

Display 14 is provided to show information to a user regarding the controlled device or system and/or other systems connected to the device 10. For example, options 20 may be displayed to indicate which function of the device 10 is currently selected. Such options may include "radio," "tape," "CD," or power, as shown.

Other information, such as the current radio frequency 22 selected for a radio tuner, may also be displayed. Furthermore, any information related to additional functionality of the device 10 may also be displayed. For example, information 24 may be provided to allow the user to select one or more functions not related to the audio operation of the device 10. In some embodiments, a map or similar graphical display may be shown on display 14 of a device 10 to allow a user to navigate.

In other embodiments, display 14 may be a separate monitor displaying a graphical user interface or other graphical environment as controlled by a host processor. Display 14 may be any suitable display device, such as an LED display, LCD display, gas plasma display, CRT, or other device. In some embodiments, display 14 may include a touch-sensitive surface to allow a user to touch displayed images directly on the display 14 to select those images and associated setting or function.

Control buttons 16 generally may be provided on device 10 to allow a user to select different functions or settings of the device. For example, on an audio device, buttons 16 may include radio station preset buttons, rewind/fast forward tape functions, power, volume control, etc. Virtually any function of the device may be assigned to buttons 16. The buttons 16 may also be used in conjunction with the control knobs 18.

Control knobs 18 are provided to allow a user a different type of control of functions and settings of device 10 than the buttons 16 allow. Knobs 18, in the described embodiment, generally may be cylindrical objects, which may be engaged and manipulated by a user. The knobs 18 alternatively may be implemented as a variety of different objects, including conical shapes, spherical shapes, dials, cubical shapes, rods, etc., and may have a variety of different textures on their circumferential surfaces, including bumps, lines, grooves, or other grips, or even projections or members extending from the circumferential surface.

In addition, any of a variety of differently-sized knobs may be provided; for example, if high-magnitude forces are output, a larger-diameter cylindrical knob is often easier for a user to interface with device 10. In the described embodiment, each knob 18 rotates in a single rotary degree of freedom about axis A extending out of the knob 18. A user may grip or contact a circumferential surface 26 of the knob 18 and rotate it a desired amount. Force feedback may be provided in this rotary degree of freedom in some embodiments, as described in further detail below.

Furthermore, the control knobs 18 may provide additional control functionality for a user. The knobs 18 may be operable to be moved by a user in one or more directions approximately perpendicular to the axis A of rotation, e.g., parallel to the surface of the front panel 12 as shown in FIG. 1. This transverse motion or direction is indicated by arrows 28. For example, the knob 18 may be moved in the four orthogonal directions shown, or may be moveable in eight directions spaced at 45 degree intervals about axis A.

In one embodiment, each transverse direction of the knob 18 may be spring loaded such that, after being moved in a direction 28 and once a user releases or stops exerting sufficient force on the knob 18, the knob 18 moves back to its centered rest position. In other embodiments, the knob 18 may be provided without such a spring bias so that knob 18 stays in any position in which it is moved until a user actively moves the knob 18 to a new position.

This transverse motion of the knob 18 may allow a user to select additional settings or functions of the device 10. In some embodiments, the additional control options provided by knob 18 may permit the number of buttons 16 and other controls to be reduced, as the functions typically assigned to these buttons can be assigned to the knob 18.

For example, a user may move a cursor 30 or other visual indicator on display 14 (e.g., pointer, selection box, arrow, or highlighting of selected text/image) to a desired selection on the display. Thus, the cursor 30 may be moved from the "radio" selection shown to the "tape" selection by moving the knob 18 in a downward direction as shown in FIG. 1. Or, the cursor 30 may be moved to the "CD" selection by moving the knob 18 in the direction to the right. A user may similarly move cursor 30 or a different indicator to the other information settings 24, to the frequency display 22, or to any other displayed option, setting, or area/region on the display 14.

Besides such cursor positioning, the transverse motion of knob 18 may also directly control values or magnitudes of settings. For example, a motion to the left of knob 18 may decrease a radio station value 22, where the value may decrease at a predetermined rate if a user continuously holds the knob 18 in the left direction. A motion to the right of the knob 18 may similarly increase the frequency value 22. In another example, once one of the information settings 24 is selected, a sub menu may be displayed and the directions 28 of the knob 18 can adjust other conditions or features, such as air temperature, a cursor on a displayed map, etc.

A manipulandum may also include a slider control 32. The slider control 32 comprises a slider knob 34, which may be adapted to be grasped by a user and moved in a linear direction as indicated by arrow 36. The slider control 32 includes force feedback functionality through an actuator. As a user moves the slider knob 34, force sensations such as a spring force, a damping force, jolts, detents, textures, or other forces can be output and felt by a user. Furthermore, the slider knob 34 may include a button 38 which can be depressed by a user similarly to the push knob embodiment discussed above with reference to knob 18. Alternatively, the knob 34 may be pushed and/or pulled similarly to the knob 18, as described above.

The slider control 32 may control any of the various functions, settings, or options of the device 10. For example, the motion left or right of knob 34 may control the radio frequency 22, where force detents are output for each station and/or each preset station previously programmed by a user. Or, the cursor 30 may be moved using the slider knob 34, such that when the cursor reaches a desired setting or selection, the user may push button 38 or push on the knob 34 to select that setting. Other functions such as volume, balance, tone, map functions, temperature functions, or mode selection may also be controlled by the slider control 32.

Other suitable manipulanda and haptics may be used. For example, U.S. Pat. No. 6,686,911, illustrates suitable knob control devices including force feedback for use in embodiments of the present invention. U.S. Pat. No. 6,686,911, assigned to the assignee of the present invention, is incorporated in its entirety herein by reference.

Figure 2:
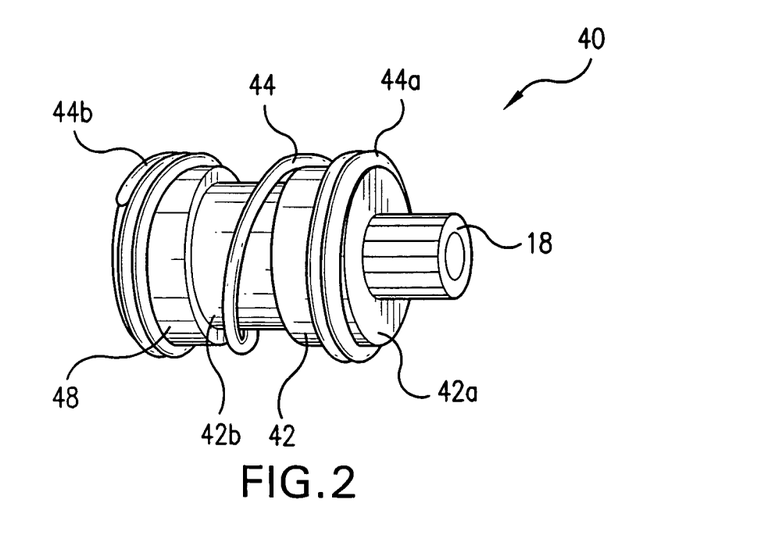
FIG. 2 shows an embodiment of the apparatus of FIG. 1 according to the present invention.

Referring now to FIG. 2, an embodiment of an assembly 40 of the device 10 of FIG. 1 is shown. The assembly 40 comprises the control knob 18 (as described above and as shown in FIG. 1), a biasing element 44, and a resistive actuator 48. The biasing element 44 may be coupled to at least one of the control knob 18 and the actuator 48. The assembly 40 may be used in devices other than device 10.

The shaft 42 comprises a first end 42*a* and a second end 42*b*. The first end 42*a* may be disposed opposite the second end 42*b* of the shaft 42. Shaft 42 may be configured to rotate about axis A (shown in FIG. 1). Knob 18 may be coupled to the first end 42*a* of the shaft 42. The resistive actuator 48 may be coupled to the second end 42*b* of the shaft 42. The resistive actuator 48 may be operable to provide force feedback functionality to the assembly 40.

In general, a resistive actuator removes energy from a system. Various resistive actuators may be used. For example, co-pending U.S. patent application Ser. No. 10/314,400, filed Dec. 8, 2002, illustrates suitable resistive actuators for use in embodiments of the present invention. U.S. patent application Ser. No. 10/314,400, assigned to the assignee of the present invention, is incorporated in its entirety herein by reference.

The biasing element 44 may be disposed between the first end 42a of the shaft 42 and the second end 42b of the shaft 42. The biasing element 44 may comprise a first end 44a and a second end 44b. In one embodiment, the biasing element 44 may comprise a torsional spring. In another embodiment, the biasing element 44 may comprise a helical spring. Alternatively, other suitable biasing elements may be used.

In an embodiment, the first end 44a of the biasing element 44 may be disposed proximate to the first end 42a of the shaft 42 and the second end 44b of the biasing element 44 may be disposed proximate to the second end 42b of the shaft 42. In one embodiment, the first end 44a of the biasing element 44 may be coupled with the knob 18. In another embodiment, the second end 44b of the biasing element may be coupled with the resistive actuator 48. Alternatively, other suitable configurations may be used.

In the configuration of the assembly 40 described above, the resistive actuator 48 may dissipate energy as the knob 18 moves over a set of detents. Maximum dissipation of energy generally occurs at the top of detents, i.e., where friction is greatest. Placing the biasing element 44 between the knob 18 and the resistive actuator 48 may store energy during the high-friction sections of the detent.

Energy in the assembly 40 may be obtained from a user who imparts potential energy by compressing the biasing element 44 to move from the bottom of a detent to the top. This stored energy may be released when the resistive actuator 48 decreases the output friction. Thus, in one embodiment when the knob 18 is released or a user stops applying a force, the knob 18 returns to a predetermined position. The resistive forces of the resistive actuator 48 may slow or control the rate of return of the biasing element 44. In another embodiment, potential energy may be generated regardless of the resistive effect of the resistive actuator 18.

The force feedback output on the knob 18 may include a variety of different force sensations. The force feedback may be integrally implemented with the control functions performed by the knob 18. Basic force sensations may comprise force detents that may be output at particular rotational positions of the knob 18 to inform a user how much the knob 18 has rotated and/or to designate a particular position of the knob 18.

The force detents may be simple jolts or bump forces to indicate the detent position, or the detents may include forces that attract the knob 18 to the particular rotational detent position and resist movement of the knob away from that position. The position may correspond to a particular radio station frequency or other station (e.g., television station frequency), thus making selection easier for a user.

Such detents may be provided for additional functions, such as volume control for sound speakers, fast forward or rewind for video display devices (such as, for example, VCRs, DVDs, DVRs, etc.), scrolling a displayed document, or web page, etc.

As described briefly above, the force feedback "snapback" detent of the assembly 40 may be used to return knob 18 to its rest or center position after a user releases the knob 18, e.g., once the knob 18 is rotated past a particular position, a function is selected, and a user releases the knob 18 to let the knob move back substantially to its original position. A damping force may also be provided on the knob 18 to slow down the rotation of the knob 18, allowing more accurate control by a user. Furthermore, several force sensations may be combined together for a single knob 18 to provide multiple simultaneous force effects.

Figure 3:
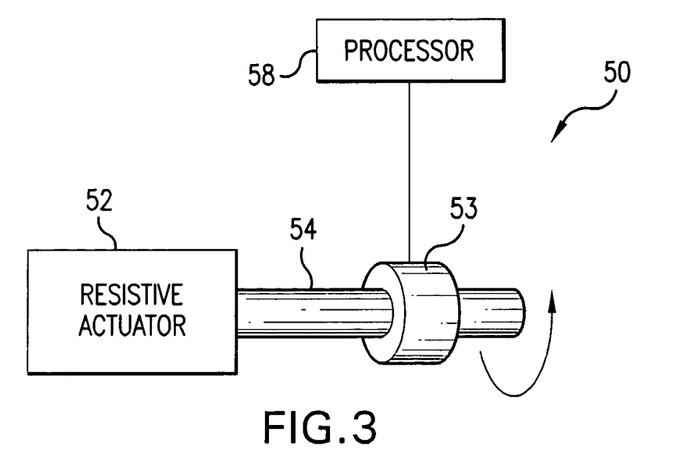
FIG. 3 shows a schematic drawing of another embodiment of an apparatus according to the present invention.
Figure 3A:
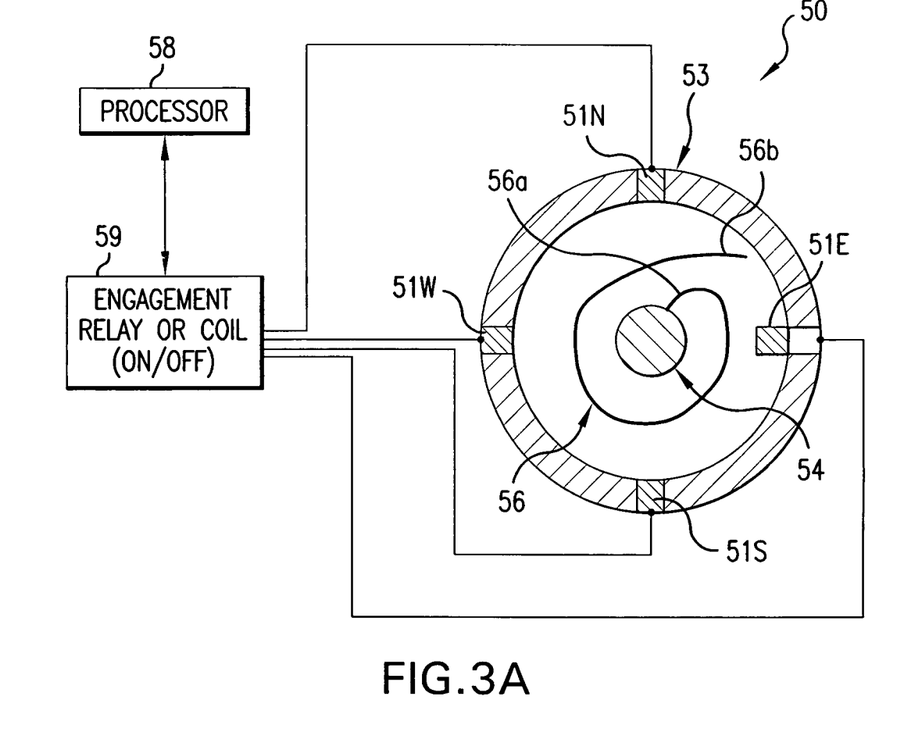
FIG. 3A shows a cutaway view of the schematic drawing shown in FIG. 3.

Referring now to FIGS. 3 and 3A, another embodiment of an assembly 50 according to the present invention is shown. The embodiment 50 may be used in the device 10, or in other suitable devices. FIGS. 3 and 3A are schematic drawings of the assembly 50. The assembly 50 may comprise a resistive actuator 52, a shaft 54 of the actuator 52, and a biasing element 56. One end of the shaft 54 may be coupled to the actuator 52, while the other end of the shaft 54 may be coupled to a manipulandum (not shown).

A processor 58 may be disposed in communication with the biasing element 56. In one embodiment, the biasing element 56 may comprises a torsional spring. In another embodiment, the biasing element 56 may comprise a helical spring. As used herein, the terms "communicate" and "communication" mean to mechanically, electrically, or otherwise contact, couple, or connect by either direct, indirect, or operational means.

In one embodiment, the processor 58 may generate and communicate a first signal to the biasing element 56. The first signal may cause a first end 56a of the biasing element 56 to couple with the shaft 54 at a location commanded by the processor 58. A second end 56b of the biasing element 56 may be coupled to a housing 53. In another embodiment, the processor 58 generates and communicates a second signal to the biasing element 56. The second signal may cause the biasing element to release or disengage from the shaft 54 of the actuator 52, thus allowing a free movement of the shaft 54.

In another embodiment, the processor 58 may generate and communicate a third signal. The third signal may cause the biasing element to be displaced along a length of the shaft 54, such that the biasing element can be coupled with the shaft at a variety of points, thus providing the assembly 50 with an assortment of haptic effects.

In the view shown in FIG. 3A, the first end 56a of the biasing element 56 may be coupled with the shaft 54. The second end 56b of the biasing element 56 may be free to rotate. The processor 58 may communicate an engagement signal to an engagement relay 59, which may be disposed in communication with the processor 58 and one or more engagement pins 51N, 51E, 51S, 51W. The engagement relay 59 may comprise a coil. The engagement signal may comprise an "on" signal that may send a current to the relay 59 causing a displacement of one or more of the engagement pins 51N, 51E, 51S, 51W.

The engagement pins 51N, 51E, 51S, 51W may be disposed in the housing 53 in a variety of configurations, such as a north, east, south, west configuration. Alternatively, the engagement pins 51N, 51E, 51S, 51W may be disposed in the housing 53 in different positions or configurations. There may be any suitable number of engagement pins.

One or more of the engagement pins 51N, 51E, 51S, 51W may trap the second end 56b of the biasing element 56 when an engagement signal has been communicated by the processor 58. The engagement pins 51N, 51E, 5S, 51W may trap the biasing element 56 by forming an interference with the second end 56b of the biasing element 56. In one embodiment, the engagement pins 51N, 51E, 51S, 51W may be magnetic, which may enhance or increase the coupling of the biasing element 56 and one of the engaging pins 51N, 51E, 51S, 51W.

A disengagement command may be communicated by the processor 58 to the engagement relay 59 causing an engagement pin 51N, 51E, 51S, 51W to retract into the housing 53, or sufficiently out of the path of the biasing element 56. The disengagement signal may comprise an "off" signal that may halt or divert the flow of current to the relay 59. Other suitable embodiments or configurations of the assembly 50 may be used.

Suitable processors may include, for example, digital logical processors capable of processing input, execute algorithms, and generate output, as necessary to cause one end (not shown) of the biasing element 56 to couple with the shaft 54 at a desired location. In one embodiment, the processor 58 may be operable to create a desired haptic effect in the assembly 50 in response to the inputs received from the knob 18.

Other suitable processors include, for example, a microprocessor, an Application Specific Integrated Circuit (ASIC), and state machines. Such processors may include, or may be in communication with, media, for example computer readable media, which store instructions that, when executed by the processor, cause the processor to perform the steps described herein as carried out, or assisted, by a processor. Other suitable structures that can communicate an actuation signal may be used.

One embodiment of a suitable computer-readable medium may include an electronic, optical, magnetic, or other storage transmission device capable of providing a processor, such as the processor in a web server, with computer-readable instructions. Other examples of suitable media may include, but are not limited to, a floppy disk, CD-ROM, magnetic disk, memory chip, ROM, RAM, ASIC, operable processor, all optical media, all magnetic tape or other magnetic media, or any other medium from which a computer processor can read.

In an embodiment, a computer readable medium of the assembly 50 comprises instructions, that, when executed, may cause the processor 58 to generate a first signal to couple the biasing element 56 with the shaft 54 of the actuator 52 and send the first signal to the biasing element 56.

In one embodiment, the computer readable medium comprises instructions, that, when executed, cause the processor to generate a second signal to release the biasing element 56 from the shaft 54, and send the second signal to the biasing element 56.

In another embodiment, the computer readable medium comprises instructions, that, when executed, cause the processor to generate a third signal to displace the biasing element 56 along a length of the shaft 54, and send the third signal to the biasing element.

Figure 4:
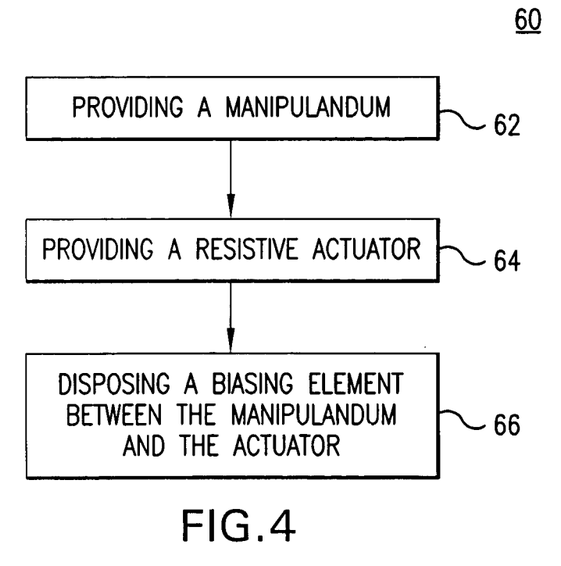
FIG. 4 shows a block diagram of an embodiment of a method according to the present invention.

Referring now to FIG. 4, an embodiment of a method 60 according to the present invention is shown. The method 60 may be employed to make a device that provides haptic feedback, such as for example, the device 10 and the assembly 40 described above. Items shown in FIGS. 1-3A may be referred to in describing FIG. 4 to aid understanding of the embodiment of the method 60 shown. However, embodiments of method 60 according to the present invention may be used in a wide variety of other devices.

Referring now to FIG. 4, block 62 indicates that method 60 may comprise providing a manipulandum. In an embodiment, the manipulandum may be operable to be displaced in a first degree of freedom and a second degree of freedom. In one embodiment, the first degree of freedom may comprise a linear degree of freedom and the second degree of freedom may comprise a rotary degree of freedom. The manipulandum may be a knob, a slider control, or a button as described above. Alternatively, other suitable manipulanda may be used.

Block 64 indicates that the method 60 may comprise providing a resistive actuator. The resistive actuator may be as that described above. Alternatively, other suitable actuators may be used. Typically, the actuator may be in communication with the manipulandum. In one embodiment, a shaft may be configured to communicate the actuator and the manipulandum. In general, the manipulandum may be coupled to one end of the shaft and the actuator may be coupled to another end of the shaft. Alternatively, other suitable configurations may be used to communicate the actuator and the manipulandum.

Block 66 indicates that the method 60 may comprise disposing a biasing element between the manipulandum and the actuator. The biasing element may be coupled to at least one of the manipulandum and the actuator. In one embodiment, the biasing element may comprise a torsional spring. In another embodiment, the biasing element may comprise a helical spring.

In an embodiment, the biasing element may comprise a first end and a second end. In one embodiment, the first end of the biasing element may be coupled with the manipulandum. In another embodiment, the second end of the biasing element may be coupled with the actuator. Alternatively, other suitable arrangements and configurations may be used.

In an embodiment, the method 60 may further comprise providing a processor in communication with the biasing element. As described above, the processor may be operable to generate and communicate a first signal to the biasing element, causing the biasing element to couple with the shaft. The processor may also be operable to generate and communicate a second signal to the biasing element, causing the biasing element to release the shaft. In this embodiment, the processor may be operable to cause the biasing element to be displaced along a length of the shaft.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed is:

1. An apparatus comprising:
a manipulandum;
a resistive actuator configured to output a force to resist movement of the manipulandum; and
a biasing element having a first end and a second end, the biasing element disposed between the manipulandum and the resistive actuator, wherein either:
the first end is coupled to the manipulandum and the second end is releasably coupled to the housing or the resistive actuator, or the first end is coupled to the resistive actuator, and the second end is releasably coupled to the housing or the manipulandum, and
wherein the biasing element is configured to be releasably coupled based on receiving a first signal and to output a biasing force substantially simultaneously with the force output by the resistive actuator.

2. The apparatus of claim 1, wherein the biasing element comprises a first end and a second end.

3. The apparatus of claim 2, wherein the first end of the biasing element is coupled with the manipulandum.

4. The apparatus of claim 2, wherein the second end of the biasing element is coupled with the actuator.

5. The apparatus of claim 1, wherein the manipulandum is operable to be displaced in a first degree of freedom and in a second degree of freedom.

6. The apparatus of claim 5, wherein the first degree of freedom comprises a linear degree of freedom and the second degree of freedom comprises a rotary degree of freedom.

7. The apparatus of claim 1, further comprising a processor in communication with the biasing element.

8. The apparatus of claim 1, wherein the biasing element comprises a torsional spring.

9. The apparatus of claim 1, wherein the biasing element comprises a helical spring.

10. The apparatus of claim 1, wherein the resistive actuator opposes a force outputted by the biasing element.

11. An method comprising:
providing a manipulandum;
providing a resistive actuator configured to output a force to resist movement of the manipulandum; and
disposing a biasing element between the manipulandum and the resistive actuator, the biasing element having a first end and a second end, and wherein either:
the first end is coupled to the manipulandum and the second end is releasably coupled to the housing or the resistive actuator, or
the first end is coupled to the resistive actuator, and the second end is releasably coupled to the housing or the manipulandum, and
wherein the biasing element is configured to be releasably coupled based on receiving a first signal and to output a biasing force substantially simultaneously with the force output by the resistive actuator.

12. The method of claim 11, wherein the biasing element comprises a first end and a second end.

13. The method of claim 12, wherein the first end of the biasing element is coupled with the manipulandum.

14. The method of claim 12, wherein the second end of the biasing element is coupled with the actuator.

15. The method of claim 11, wherein the manipulandum is operable to be displaced in a first degree of freedom and in a second degree of freedom.

16. The method of claim 15, wherein the first degree of freedom comprises a linear degree of freedom and the second degree of freedom comprises a rotary degree of freedom.

17. The method of claim 11, further comprising providing a processor in communication with the biasing element.

18. The method of claim 11, wherein the biasing element comprises a torsional spring.

19. The method of claim 11, wherein the biasing element comprises a helical spring.

20. The method of claim 11, wherein the resistive actuator opposes a force outputted by the biasing element.

21. A non-transitory computer readable medium comprising instructions, that, when executed, cause a processor to perform the steps of:
generating a first signal to releasably couple a biasing element with a resistive actuator, a manipulandum, or a housing; and
communicating the first signal to the biasing element, the biasing element configured output a biasing force substantially simultaneously with a resistive force output by the resistive actuator.

22. The non-transitory computer readable medium of claim 21, further comprising instructions, that when executed, cause the processor to perform the steps of:
generating a second signal to release the biasing element from the resistive actuator, the manipulandum, or the housing; and
communicating the second signal to the biasing element.

23. The non-transitory computer readable medium of claim 21, wherein the first signal is configured to:
displace the biasing element along a length of a shaft coupled to the manipulandum.

24. The non-transitory computer readable medium of claim 21, wherein the biasing element comprises a first end and a second end.

25. The non-transitory computer readable medium of claim 24, wherein the first end of the biasing element is coupled with a manipulandum.

26. The non-transitory computer readable medium of claim 25, wherein the manipulandum is operable to be displaced in a first degree of freedom and a second degree of freedom.

27. The non-transitory computer readable medium of claim 26, wherein the first degree of freedom comprises a linear degree of freedom and the second degree of freedom comprises a rotary degree of freedom.

28. The non-transitory computer readable medium of claim 24, wherein the second end of the biasing element is coupled with the actuator.

29. The non-transitory computer readable medium of claim 21, wherein the biasing element comprises a torsional spring.

30. The non-transitory computer readable medium of claim 21, wherein the biasing element comprises a helical spring.

* * * * *